United States Patent
Purschwitz, Jr. et al.

(10) Patent No.: US 7,284,504 B1
(45) Date of Patent: Oct. 23, 2007

(54) METHOD OF CARRYING AND ASSISTING THE MOVEMENT OF A DOG

(76) Inventors: Edwin L. Purschwitz, Jr., 2653 Horseshoe Ct., Cocoa, FL (US) 32926; Saundra L. Purschwitz, 2653 Horseshoe Ct., Cocoa, FL (US) 32926

( * ) Notice: Subject to any disclaimer, the term of this patent is extended or adjusted under 35 U.S.C. 154(b) by 124 days.

(21) Appl. No.: 10/853,056

(22) Filed: May 26, 2004

(51) Int. Cl.
*A01K 27/00* (2006.01)

(52) U.S. Cl. ...................................... 119/792

(58) Field of Classification Search ............. 119/792, 119/868, 793, 850, 854, 869, 8
See application file for complete search history.

(56) References Cited

U.S. PATENT DOCUMENTS

| | | | |
|---|---|---|---|
| 4,530,309 A | 7/1985 | Collins | |
| 4,559,906 A | 12/1985 | Smith | |
| 5,193,486 A | 3/1993 | Kitchens | |
| 5,632,235 A | 5/1997 | Larsen et al. | |
| 5,738,043 A | 4/1998 | Manuel | |
| 5,845,606 A | 12/1998 | Hartman | |
| D453,594 S | 2/2002 | Ishihara | |
| 6,367,424 B1 | 4/2002 | Higham | |
| 6,387,187 B2 * | 5/2002 | Yavorsky ....................... 134/2 |
| 6,450,130 B1 * | 9/2002 | Goldberg ..................... 119/792 |
| 6,543,390 B2 * | 4/2003 | Lowery ....................... 119/771 |
| 6,880,489 B2 * | 4/2005 | Hartmann et al. .......... 119/856 |

* cited by examiner

*Primary Examiner*—Peter M. Poon
*Assistant Examiner*—Bethany L. Griles

(57) ABSTRACT

A method of assisting the movement of a dog includes a carrying strap that is elongated and has a front end and a rear end. A first front leg strap and a second front leg strap are provided. Each of the first and second front leg straps has a first end and a second end. A first coupling assembly is adapted for selectively coupling each of the first and second ends of the first and second front leg straps to the front end of the carrying strap. Each of a pair rear leg straps includes a loop portion and an elongated portion. Each of the elongated portions is attached to and extends away from one of the loop portions. The elongated portions each have a free end. A second coupling assembly is adapted for selectively coupling each of the free ends to the rear end of the carrying strap.

17 Claims, 4 Drawing Sheets

METHOD OF CARRYING AND ASSISTING THE MOVEMENT OF A DOG

BACKGROUND OF THE INVENTION

1. Field of the Invention

The present invention relates to canine restraining devices and more particularly pertains to a new canine restraining device for carrying or assisting a canine without injuring the canine. In particular, this device could be used as an aid for lifting, stabilizing, carrying and restraining post-operative, arthritic, elderly or handicapped dogs.

2. Description of the Prior Art

The use of canine restraining devices is known in the prior art. U.S. Pat. No. 5,845,606 describes a device for harnessing a dog that includes a neck strap that is extended around the neck of the dog and includes a plurality of additional straps that are extended around various areas of the dog's body. Another type of canine restraining device is U.S. Pat. No. 4,559,906 having a pair of body straps that are extended around the body of a dog and a chest portion that is attached to the body straps and is extendable around the chest of the dog. Yet another such device is U.S. Pat. No. 4,530,309 that includes a body wrap with a handle for picking up a dog and a neck strap that is wrapped around the dog to ensure that the body wrap remains in position. Still another device is U.S. Pat. No. 5,738,043 that includes a panel having a plurality of leg openings therein for receiving the legs of a dog. The edges of the panel may be closed together so that the dog may be lifted with the panel.

While these devices fulfill their respective, particular objectives and requirements, the need remains for a harness that is well suited for positioning on a small dog so that that the dog may be safely lifted with the harness. Such a harness should include a strap arrangement that ensures that the weight of the animal is placed on the leg joints and chest as opposed to the neck where damage can be done to the trachea or larynx of the dog. The device should also be constructed of straps instead of a flexible panel to that the device is more efficiently stored and the dog received adequate airflow around its body. Additionally, the device should be adapted for being worn at all times, but be able to be quickly removed by the caretaker of the dog.

SUMMARY OF THE INVENTION

The present invention meets the needs presented above by generally comprising a carrying strap that is elongated and has a front end and a rear end. A first front leg strap and a second front leg strap are provided. Each of the first and second front leg straps is elongated and has a first end and a second. A first coupling assembly is adapted for selectively coupling each of the first and second ends of the first and second front leg straps to the front end of the carrying strap. Each of a pair rear leg straps includes a loop portion and an elongated portion. Each of the elongated portions is attached to and extends away from one of the loop portions. The elongated portions each have a free end. A second coupling assembly is adapted for selectively coupling each of the free ends to the rear end of the carrying strap. The carrying strap is positioned on that back of a dog. The first front leg strap is attached to the front end of the carrying strap with the first coupling assembly such that the first front leg strap extends away from the front end, over a right shoulder of the dog, across the chest of the dog, under and behind a front left leg of the dog and upwardly to the front end. The second front leg strap is attached to the front end of the carrying strap such that the second front leg strap extends away from the front end, over a left shoulder of the dog, across the chest of the dog, under and behind a front right leg of the dog and upwardly to the front end. Each one of a pair of rear legs of the dog are extended through one of the loop portions and each of the free ends is attached to the rear end with the second coupling assembly such that each of the rear legs is positioned in one of the loop portions.

The manner in which the device of the current invention is used allows it to be positioned on a dog so that the dog may be stabilized during exercise, while rising from a seated or a lying position, or for walking up stairs. This will ensure that the dog receives proper exercise after an injury or medical treatment and allows a caretaker of the dog to assume part of the weight of the dog for those dogs that are arthritic or elderly. The positioning also allows for an owner to pick the dog up without fear of injuring the dog. These features will alleviate need to put a dog to sleep because of mobility problems.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
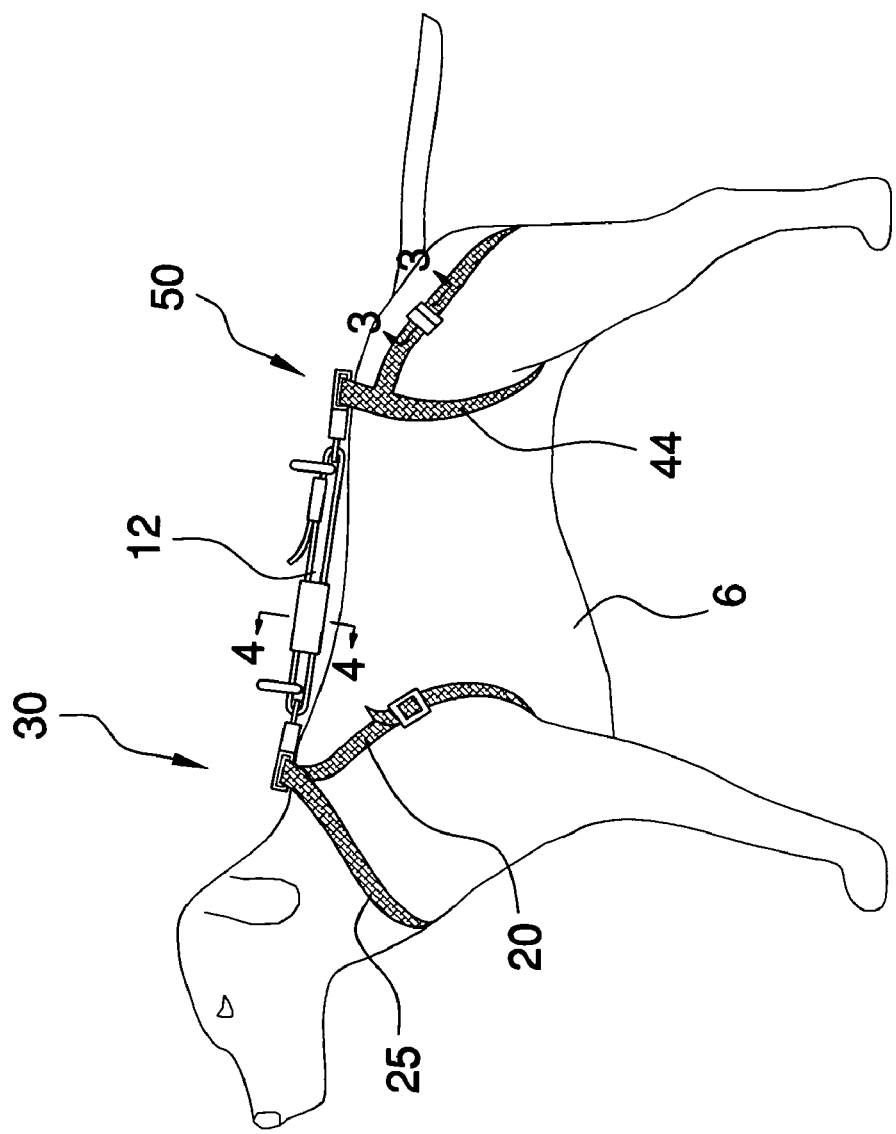
FIG. 1 is a side in-use view of a method of carrying and assisting the movement of a dog according to the present invention.
Figure 2:
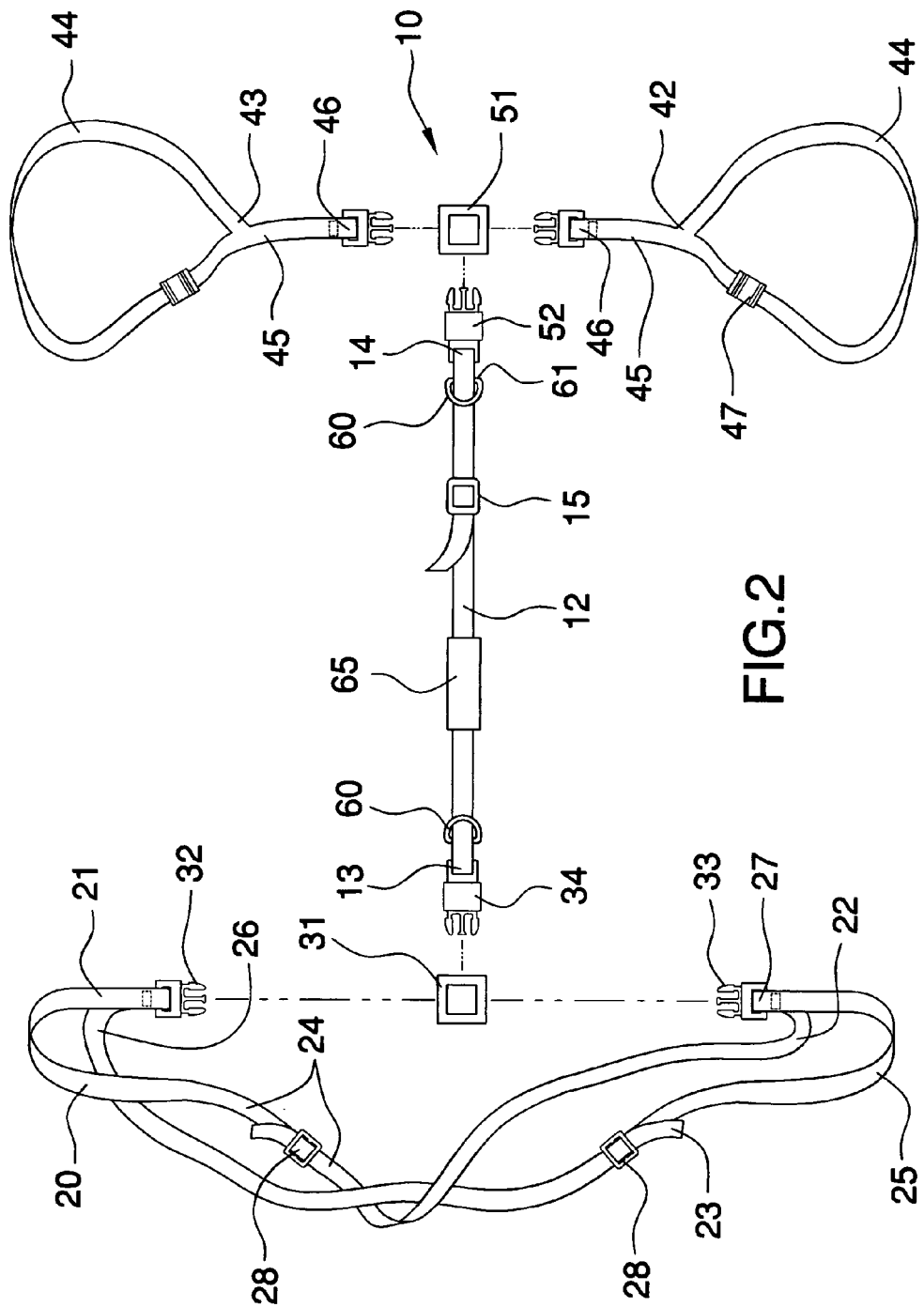
FIG. 2 is a top view of the present invention.

With reference now to the drawings, and in particular to FIGS. 1 through 5 thereof, a new canine restraining device embodying the principles and concepts of the present invention and generally designated by the reference numeral 10 will be described.

As best illustrated in FIGS. 1 through 5, a device 10 and method of carrying and assisting the movement of a dog generally comprises a carrying strap 12 that is elongated. The carrying strap 12 has a front end 13 and a rear end 14. The carrying strap 12 may be formed into a loop. A conventional adjustment buckle 15 is positioned on the carrying strap for selectively determining a length of the carrying strap 12.

A first front leg strap 20 and a second front leg strap 25 are each provided. Each of the first 20 and second 25 front leg straps is elongated and has a first end 21, 26 and a second end 22, 27 respectfully. Each of a pair of adjustment buckles 28 is positioned on one of the first 20 and second 25 front leg straps for selectively determining a length of each of the first 20 and second 25 front leg straps. The first 20 and second 25 leg straps may each have a break 23 therein such that two portions 24 are formed which are attached to together with the adjustment buckles 28.

A first coupling assembly 30 is adapted for selectively coupling each of the first 21, 26 and second 22, 27 ends of the first 20 and second 25 front leg straps to the front end 13 of the carrying strap 12. The first coupling assembly includes 30 a primary coupler 31 and a plurality of secondary couplers. Each of the secondary couplers is adapted for being simultaneously removably coupled to the primary coupler 31. A first of 32 the secondary couplers is attached to the first ends 21, 26 of the first 20 and second 25 front leg straps and a second 33 of the secondary couplers is attached to the second ends 22, 27 of the first 20 and second 25 front legs straps such that the first 20 and second 25 front legs straps cross each other. A third 34 of the secondary couplers is attached to the front end 13 of the carrying strap 12.

Figure 5:
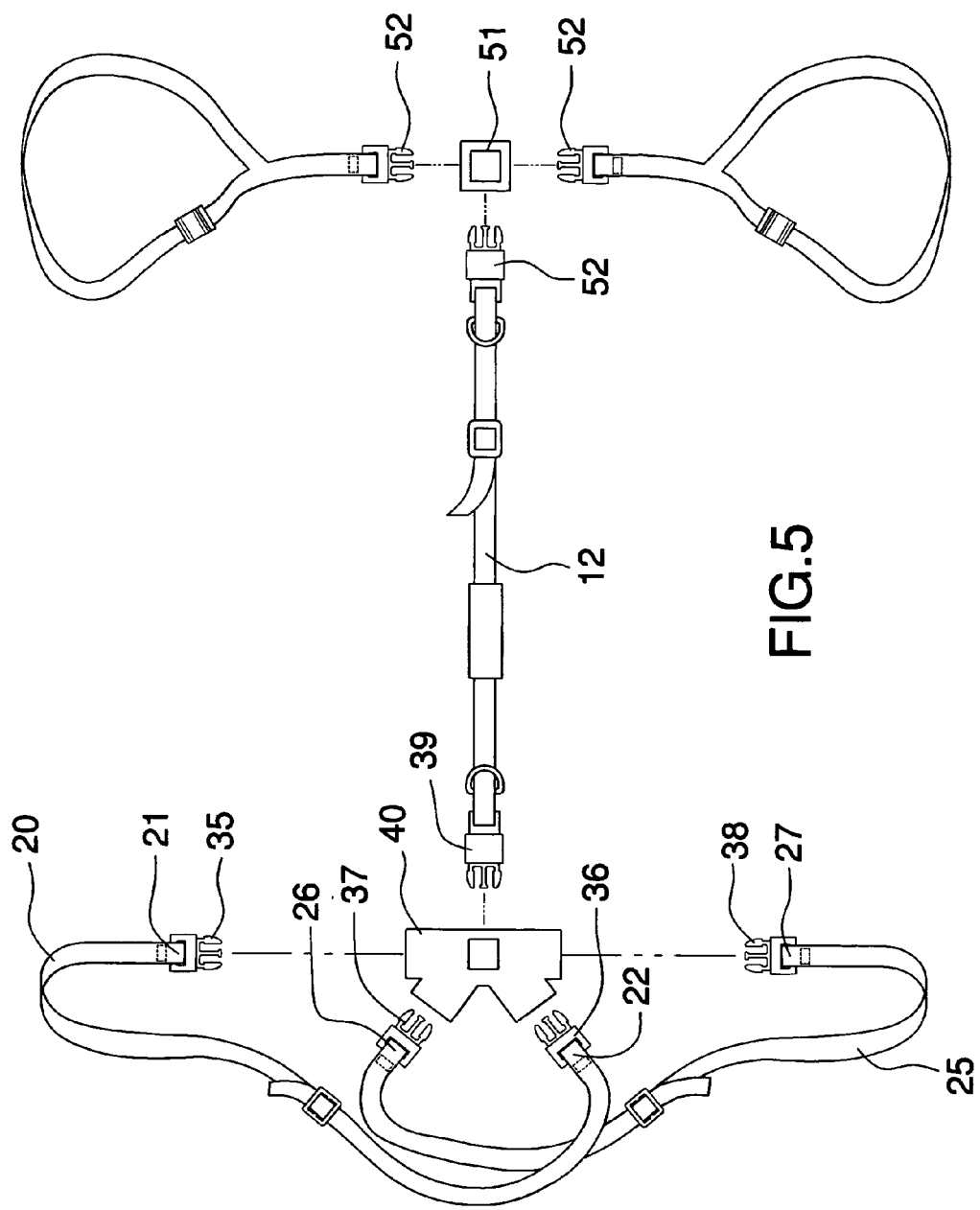
FIG. 5 is a top view of the second embodiment of the present invention.

A second embodiment, shown in FIG. 5, includes five secondary couplers. A first 35 of the secondary couplers attached to the first end 21 of the first front leg strap 20. A second 36 of the secondary couplers is attached to the second end 22 of the first front leg strap 20. A third 39 of the secondary couplers is attached to the front end 13 of the carrying strap 12. A fourth 37 of the secondary couplers is attached to the first end 26 of the second front leg strap 25, and a fifth 38 of the secondary couplers is attached to the second end 27 of the second front leg strap 25. A primary coupler 40 of the second embodiment is adapted for simultaneously receiving five of the secondary couplers. In each embodiment, it is preferred that the primary couplers 31, 40 are female couplers each having the ability to receive multiple secondary couplers. The secondary couplers 32-39 are each preferably male couplers. The primary and secondary couplers are of conventional buckle construction.

Figure 3:
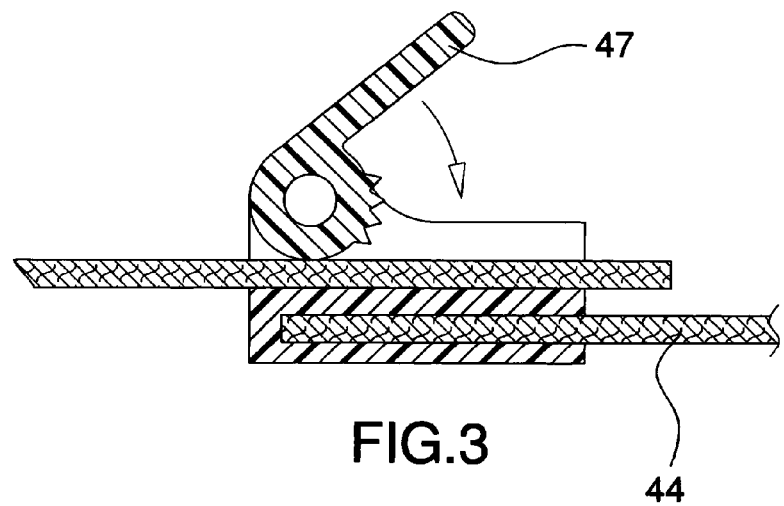
FIG. 3 is a cross-sectional view taken along line 3-3 of FIG. 1 of the present invention.
Figure 4:
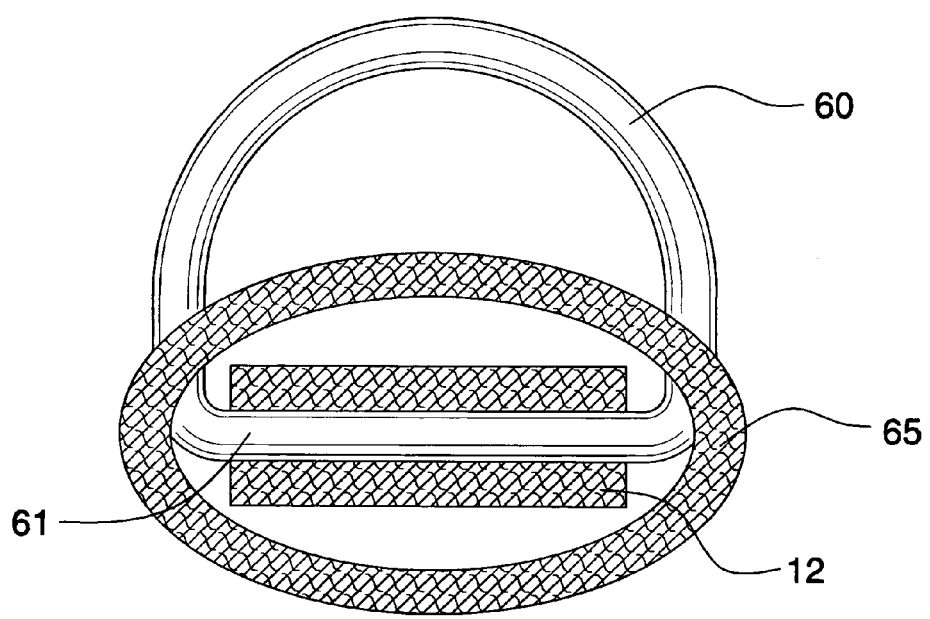
FIG. 4 is a cross-sectional view taken along line 4-4 of FIG. 1 of the present invention.

A pair rear leg straps 42, 43 is provided. Each of the rear leg straps 42, 43 includes a loop portion 44 and an elongated portion 45. Each of the elongated portions 45 is attached to and extends away from one of the loop portions 44. The elongated portions 45 each have a free end 46. An adjustment means 47 is positioned on each of the loop portions 44 for selectively adjusting a length of the loop portions 44. The loop portions 44 may each include two sections that are attached together by the adjustment means as shown in FIG. 3. Each of the adjustment means 47 preferably comprises a cam buckle which allows for easy relatively easy adjustments, though it should be understood that other conventional buckles could be utilized.

A second coupling assembly 50 is adapted for selectively coupling each of the free ends 46 to the rear end 14 of the carrying strap 12. The second coupling assembly 50 includes a primary mating member 51 and three secondary mating members 52. Each of the secondary mating members 52 is adapted for being simultaneously removably coupled to the primary mating member 50. A first of the secondary mating members 52 is attached to a first of the free ends 46 on a first of the rear leg straps 42, a second of the secondary mating members 52 is attached to a second of the free ends 46 on a second of the rear leg straps 43 and, a third of the secondary mating members 52 is attached to the rear end 14 of the carrying strap 12. It is preferred that the primary mating member 51 is a female coupler having the ability to receive multiple secondary mating members 52. The secondary mating members 52 are each preferably male couplers. The primary 51 and secondary 52 mating members are of conventional buckle construction.

It is preferred that the device of the method includes at least one ring member 60 that is attached to the carrying strap. The ring member 60 is preferably D-shaped and includes a linear portion 61 orientated perpendicular to the carrying strap 12. The ring member 60 may be immovably attached to the carrying strap 12 or the carrying strap 12 may be extended through the ring member 60 so that that the ring member 60 is movable along the carrying strap 12. A second ring member 60 may be positioned on the carrying strap 12 as well and it is preferred that each of the ring members 60 is positioned adjacent to one of the front 13 and rear 14 ends of the carrying strap 12. The ring members 60 are used for attaching a leash, or secondary lifting strap, to the carrying strap 12.

It is also preferred that a gripping member 65 is positioned on the carrying strap 12 and is positioned generally between the front 13 and rear 14 ends. The gripping member 65 is preferably comprised of a cloth, leather or elastomeric material for providing comfort to a person gripping the carrying strap 12.

In use, the carrying strap 12 is positioned on a back of a dog 6 so that the front end 13 is directed toward the head and the rear end 14 is directed toward the tail of the dog 6. The first front leg strap 20 is attached to the front end 13 of the carrying strap 12 with the first coupling assembly 30 such that the first front leg strap 20 extends away from the front end 13, over a right shoulder of the dog, across the chest of the dog, under and behind a front left leg of the dog and upwardly to the front end 13. The second front leg strap 25 is attached to the front end 13 of the carrying strap 12 with the first coupling assembly 30 such that the second front leg strap 25 extends away from the front end, over a left shoulder of the dog, across the chest of the dog, under and behind a front right leg of the dog and upwardly to the front end 13. This positions the first 20 and second 25 front legs straps across the chest of the dog 6 so that the first 20 and second 25 leg straps are not positioned on the neck of the dog 6. The adjustment buckles 28 may be used for adjusting the positioning of the first 20 and second 25 leg straps across the chest of the dog 6.

The rear legs of the dog 6 are each extended through one of the loop portions 44. The free ends 46 of the elongated members 45 are then attached to the rear end 14 with the second coupling assembly 50 so that each of the rear legs is positioned in one of the loop portions 44. The cam clamps 47 are used for easier adjusting of the loop portions 44 so that the entire device 10 of the method is secure on the dog 6.

Generally, the device is positioned on small to medium dogs 6, such as those less than 40 pounds, so that the dogs 6 may be picked up or assisted with the carrying strap 12. In particular, the device 10 allows a person to easily carry and move a dog 6 if either the dog 6 has trouble moving on its own, or the person does not have a sufficient amount of strength to handle the dog 6 without the carrying strap 12. A leash or secondary lifting strap, attached to the ring member 60, may be used to assist the dog in rising or walking by lifting weight off of the dog, particularly when the dog is moving up or down stairs. The positioning of the first 20 and second 25 front leg straps ensure that the dog 6 will not be harmed by the pressure of a strap on its trachea.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for restraining and carrying a dog, said method including the steps of:
   providing a carrying strap, said carrying strap being elongated, said carrying strap having a front end and a rear end;
   providing a first front leg strap and a second front leg strap, each of said first and second front leg straps being elongated and having a first end and a second;
   providing a first coupling assembly being adapted for selectively coupling each of said first and second ends of said first and second front leg straps to said front end of said carrying strap, said first coupling assembly includes a primary coupler and a plurality of secondary couplers, each of said secondary couplers being adapted for being simultaneously removably coupled to said primary coupler, a first of said secondary couplers being attached to said first ends of said first and second front leg strap, a second of said secondary couplers being attached to said second ends of said first and second front legs straps such that said first and second front legs straps cross each other, a third of said secondary couplers being attached to said front end of said carrying strap;
   providing a pair rear leg straps, each of said rear leg straps including a loop portion and an elongated portion, each of said elongated portions being attached to and extending away from one of said loop portions, each of said elongated portions having a free end;
   providing a second coupling assembly being adapted for selectively coupling each of said free ends to said rear end of said carrying strap, said second coupling assembly including a primary mating member and a plurality of secondary mating members, each of said secondary mating members being adapted for being simultaneously removably coupled to said primary mating member, a first of said secondary mating members being attached to a first of said free ends, a second of said secondary mating members being attached to a second of said free ends, a third of said secondary mating members being attached to said rear end of said carrying strap;
   positioning the carrying strap on a back of a dog;
   attaching said first and second front leg straps to said front end of said carrying strap with said first coupling assembly such that said first front leg strap extends away from said front end, over a right shoulder of the dog, across the chest of the dog, under and behind a left leg of the dog and upwardly to the front end, and such that said second front leg strap extends away from said front end, over a left shoulder of the dog, across the chest of the dog, under and behind a right leg of the dog and upwardly to the front end; and
   extending each one of a pair of rear legs of the dog through one of said loop portions and attaching each of said free ends to said rear end with said second coupling assembly such that each of said rear legs is positioned in one of said loop portions.

2. The method according to claim 1, wherein the step of providing a carrying strap includes an adjustment buckle being positioned on said carrying strap for selectively determining a length of said carrying strap.

3. The method according to claim 1, wherein the step of providing first and second front leg straps includes each of a pair of adjustment buckles being positioned on one of said first and second front leg straps for selectively determining a length of each of said first and second front leg straps.

4. The method according to claim 1, wherein said step of providing a pair rear leg straps further includes an adjustment means being positioned on each of said loop portions for selectively adjusting a length of said loop portions.

5. The method according to claim 4, wherein each of said adjustment means comprises a cam buckle.

6. The method according to claim 1, further including the step of providing at least one ring member being attached to said carrying strap.

7. The method according to claim 1, further including the step of providing a gripping member being positioned on said carrying strap and being positioned generally between said front and rear ends.

8. A method for restraining and carrying a dog, said method including the steps of:
   providing a carrying strap, said carrying strap being elongated, said carrying strap having a front end and a rear end, said carrying strap forming a loop, an adjustment buckle being positioned on said carrying strap for selectively determining a length of said carrying strap;
   providing a first front leg strap and a second front leg strap, each of said first and second front leg straps being elongated and having a first end and a second, each of a pair of adjustment buckles being positioned on one of said first and second front leg straps for selectively determining a length of each of said first and second front leg straps;
   providing a first coupling assembly being adapted for selectively coupling each of said first and second ends of said first and second front leg straps to said front end of said carrying strap, said first coupling assembly including a primary coupler and a plurality of secondary couplers, each of said secondary couplers being adapted for being simultaneously removably coupled to said primary coupler, a first of said secondary couplers being attached to said first ends of said first and second front leg strap, a second of said secondary couplers being attached to said second ends of said first and second front legs straps such that said first and second front legs straps cross each other, a third of said secondary couplers being attached to said front end of said carrying strap;
   providing a pair rear leg straps, each of said rear leg straps including a loop portion and an elongated portion, each of said elongated portions being attached to and extending away from one of said loop portions, each of said elongated portions having a free end, an adjustment means being positioned on each of said loop portions for selectively adjusting a length of said loop portions, each of said adjustment means comprising a cam buckle;
   providing a second coupling assembly being adapted for selectively coupling each of said free ends to said rear end of said carrying strap, said second coupling assembly including a primary mating member and a plurality of secondary mating members, each of said secondary mating members being adapted for being simultaneously removably coupled to said primary mating member, a first of said secondary mating members being attached to a first of said free ends, a second of said secondary mating members being attached to a second of said free ends, a third of said secondary mating members being attached to said rear end of said carrying strap;

providing at least one ring member being attached to said carrying strap;

providing a gripping member being positioned on said carrying strap and being positioned generally between said front and rear ends;

positioning the carrying strap on a back of a dog;

attaching said first and second front leg straps to said front end of said carrying strap with said first coupling assembly such that said first front leg strap extends away from said front end, over a right shoulder of the dog, across the chest of the dog, under and behind a left leg of the dog and upwardly to the front end, and such that said second front leg strap extends away from said front end, over a left shoulder of the dog, across the chest of the dog, under and behind a right leg of the dog and upwardly to the front end; and extending each one of a pair of rear legs of the dog through one of said loop portions and attaching each of said free ends to said rear end with said second coupling assembly such that each of said rear legs is positioned in one of said loop portions.

9. A method for restraining and carrying a dog, said method including the steps of:

providing a carrying strap, said carrying strap being elongated, said carrying strap having a front end and a rear end;

providing a first front leg strap and a second front leg strap, each of said first and second front leg straps being elongated and having a first end and a second;

providing a first coupling assembly being adapted for selectively coupling each of said first and second ends of said first and second front leg straps to said front end of said carrying strap;

providing a pair rear leg straps, each of said rear leg straps including a loop portion and an elongated portion, each of said elongated portions being attached to and extending away from one of said loop portions, each of said elongated portions having a free end;

providing a second coupling assembly being adapted for selectively coupling each of said free ends to said rear end of said carrying strap;

positioning the carrying strap on a back of a dog;

attaching said first and second front leg straps to said front end of said carrying strap with said first coupling assembly such that said first front leg strap extends away from said front end, over a right shoulder of the dog, across the chest of the dog, under and behind a left leg of the dog and upwardly to the front end, and such that said second front leg strap extends away from said front end, over a left shoulder of the dog, across the chest of the dog, under and behind a right leg of the dog and upwardly to the front end; and extending each one of a pair of rear legs of the dog through one of said loop portions and attaching each of said free ends to said rear end with said second coupling assembly such that each of said rear legs is positioned in one of said loop portions.

10. The method according to claim 9, wherein the step of providing a carrying strap includes an adjustment buckle being positioned on said carrying strap for selectively determining a length of said carrying strap.

11. The method according to claim 9, wherein the step of providing first and second front leg straps includes each of a pair of adjustment buckles being positioned on one of said first and second front leg straps for selectively determining a length of each of said first and second front leg straps.

12. The method according to claim 9, wherein said step of providing a pair rear leg straps further includes an adjustment means being positioned on each of said loop portions for selectively adjusting a length of said loop portions.

13. The method according to claim 12, wherein each of said adjustment means comprises a cam buckle.

14. The method according to claim 9, further including the step of providing at least one ring member being attached to said carrying strap.

15. The method according to claim 9, further including the step of providing a gripping member being positioned on said carrying strap and being positioned generally between said front and rear ends.

16. The method according to claim 9, wherein said first coupling assembly includes a primary coupler and a plurality of secondary couplers, each of said secondary couplers being adapted for being simultaneously removably coupled to said primary coupler, a first of said secondary couplers being attached to said first ends of said first and second front leg strap, a second of said secondary couplers being attached to said second ends of said first and second front legs straps such that said first and second front legs straps cross each other, a third of said secondary couplers being attached to said front end of said carrying strap.

17. The method according to claim 9, wherein said second coupling assembly includes a primary mating member and a plurality of secondary mating members, each of said secondary mating members being adapted for being simultaneously removably coupled to said primary mating member, a first of said secondary mating members being attached to a first of said free ends, a second of said secondary mating members being attached to a second of said free ends, a third of said secondary mating members being attached to said rear end of said carrying strap.

* * * * *